UNITED STATES PATENT OFFICE.

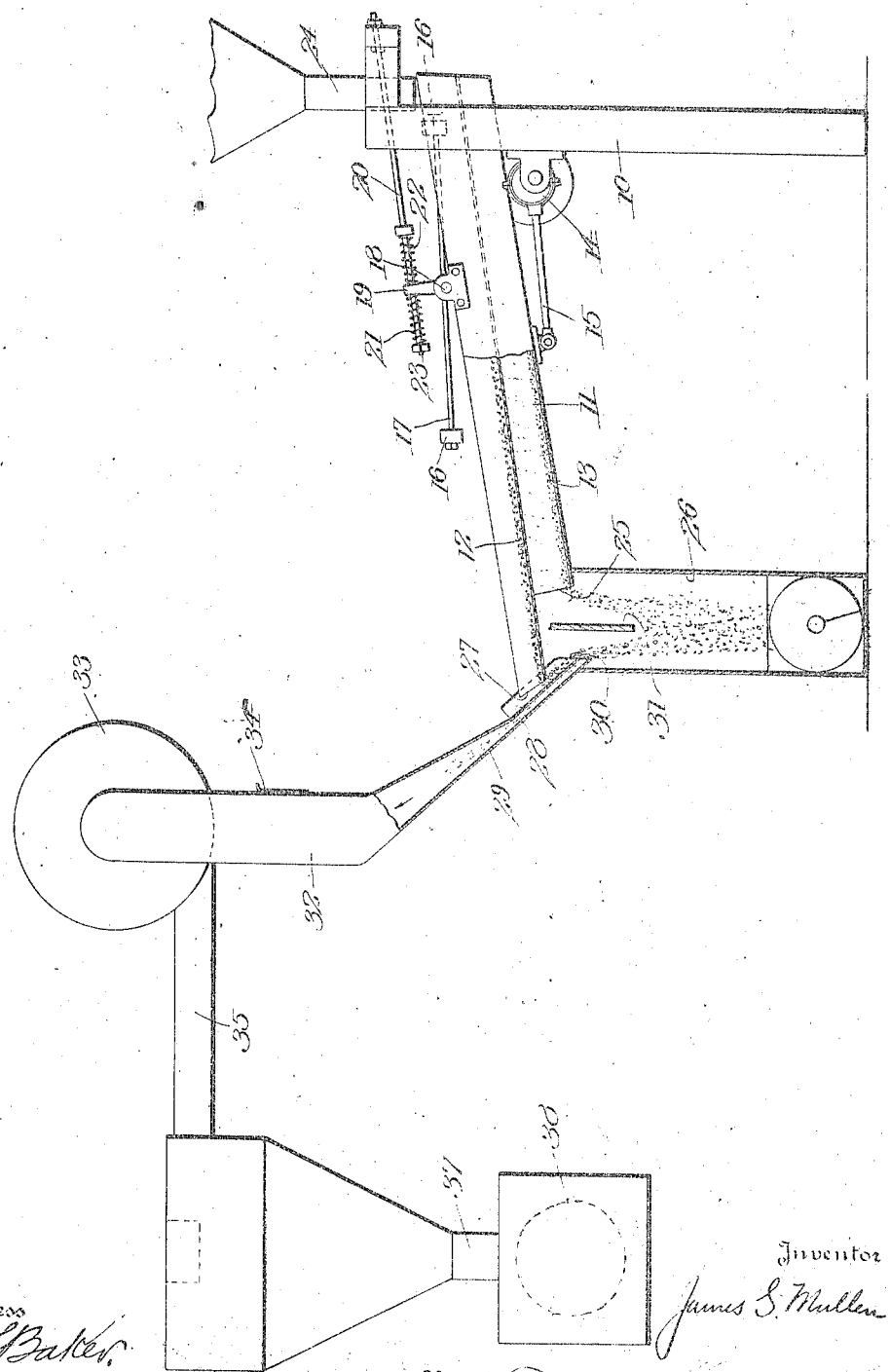

JAMES S. MULLEN, OF RICHLAND, GEORGIA.

METHOD OF AND APPARATUS FOR TREATING A MIXTURE OF COTTON-SEED MEATS, HULLS, AND LINT.

1,286,389. Specification of Letters Patent. Patented Dec. 3, 1918.

Application filed July 13, 1916. Serial No. 109,092.

*To all whom it may concern:*

Be it known that I, JAMES S. MULLEN, a citizen of the United States, and resident of Richland, Stewart county, State of Georgia, have invented certain new and useful Improvements in Methods of and Apparatus for Treating a Mixture of Cotton-Seed Meats, Hulls, and Lint, of which the following is a specification.

This invention relates to a method and an apparatus for treating a mixture of cotton seed hulls, lint and meats after they are passed through the hulling mechanism and before oil is pressed out.

The principal object of the invention is to make a higher grade of cotton seed meal by removing more lint and hulls from the mixture than it is possible to screen out.

Another important object of the invention is to regulate the separation of the hulls from the cotton seed meats and to control the protein and ammonia content of the meal. Heretofore the ammonia and protein content of the meal has been controlled by putting a finer or coarser screen on the separating machinery, but by my system of air control any amount or all of the hulls can be removed from the meats to make the various grades of meal which the market demands, only a slight alteration of the air current being required.

The above and other objects and the novel features of the invention will be apparent from the following description taken in connection with the accompanying drawing, which illustrates a mechanism embodying my invention.

Referring to the drawing, 10 designates a frame work on which a screening mechanism is mounted. The screening mechanism comprises an inclined, substantially rectangular frame 11, which is open at the top and at its lower end. The frame 11 has a false bottom which consists of a screen 12 of perforated metal spaced above the bottom 13 of the frame. The screen 12 extends the entire length of the frame 11 and projects beyond the lower end of the bottom 13. The frame 11 is supported so that it may be given a slight reciprocating motion by means of an eccentric 14 which is connected to the bottom of the frame 11 by the rod 15. In order to clean the screen 12 I have provided hammers 16, which are fastened at the ends of a rod 17. The rod 17 is pivoted at its center in brackets 18 mounted on opposite sides of the frame 11. The rod is provided with an upwardly extending arm 19, which has a fixed rod 20 passing through an opening in its upper end. Springs 21 and 22 surround the rod 20 and bear against opposite sides of the arm 19 and against the nuts 23 on the rod 20. When the eccentric 14 shakes the frame 11, the hammers 16 will alternately, yieldingly strike the screen 12 and prevent the clogging of the same.

The mixture of meats, hulls and lint is discharged from the spout 24 onto the upper end of the screen 12. As the screen is shaken the material moves downwardly and a large proportion of the finer meats will pass through the screen 12 onto the bottom 13 and will be discharged through the opening 25 at the lower end into a chute 26 which leads to a conveyer trough or other suitable means for conveying the meats to the pressing mechanism.

The remainder of the material which contains the coarse meats, hulls and lint will pass downwardly over the screen 12, discharging through the opening 27 and over the upper side 28 of the air nozzle 29. This material will descend in a relatively thin and broad stream across the inlet mouth 30 of the air nozzle 29 and the current of air which is drawn upwardly into the nozzle will cross this stream of descending material and carry with it the lighter material, such as hulls, lint, and some fine meats, which may not have passed through the screen 12. The coarser meats and some of the hulls descend into the chute 26 to be mixed with the fine meats which passed through the screen 12. An air deflector board 31 is arranged between the mouth 30 and the opening 25 to keep the current of air from drawing finer meats into the nozzle 29.

The nozzle 29 is at the lower end of a pipe 32 which leads to a fan casing 33 containing a suitable rotary fan for causing the necessary current of air for separating purposes. In order to vary the protein and ammonia content of the meats sent to the press room, the air pressure may be altered by means of a slide 34 which regulates the size of an opening in the air pipe 32. By merely changing the size of the opening controlled by the slide 34, the lifting power of the air current may be varied within a wide range and any desired grade of material may be delivered to the oil presses.

From the fan casing 33 the hulls etc. pass through a pipe 35 to a cyclone condenser 36 in which the hulls and lighter meats are separated from the air. The hulls and lighter meats then pass downwardly through a spout 37 at the lower end of the condenser and are delivered into a screening cylinder 38 which separates the meats from the hulls. The meats may then be delivered by a suitable conveyer to the oil presses.

From the foregoing description it will be seen that I have provided a simple mechanism by means of which the meats may be separated from the hulls and lint. The meats are more thoroughly separated from the hulls by this mechanism and therefore the capacity of the press room is considerably increased because the presses which formerly operated upon a more incompletely separated mixture of hulls, lint and meats may now be used on meats which are nearly entirely free of hulls and lint. The arrangement herein disclosed also provides for a simpler control of the protein and ammonia content of the meal. By a simple adjustment of the slide 34 any grade of material may be provided for the oil presses.

While I have shown and described the invention in detail I do not wish to be limited to the exact form of mechanism illustrated as it will be obvious that numerous changes may be made in details without departing from the principles of the invention.

Having thus described the invention, what is claimed and desired to be secured by Letters Patent is:

1. The method of treating a mixture of hulls, lint, fine meats and coarse meats to separate hulls and lint therefrom and control the protein and ammonia content of the meal which consists in first separating fine meats from the mixture and then subjecting the remainder of the mixture to a variable current of air to remove lint therefrom and also to remove so much of the hulls as is necessary to keep the protein and ammonia content at a predetermined value.

2. The method of treating a mixture of cotton seed hulls, lint, fine meats and coarse meats to separate hulls and lint therefrom and control the protein and ammonia content of the meal which consists in first separating fine meats from the mixture, then subjecting the remainder of the mixture to a variable current of air to remove lint therefrom and also to remove so much of the hulls as is necessary to keep the protein and ammonia content at a desired value, and then separating and collecting the hulls and lint.

3. In a separating mechanism and ammonia controller of the class described, the combination of means for separating fine meats from a body of hulls, lint, coarse and fine meats, pneumatic means for removing hulls and lint from the remainder of said body of material, and means for regulating said pneumatic means to vary the amount of hulls removed and thereby alter the ammonia content of the meats as desired.

4. In a separating mechanism and ammonia controller of the class described, the combination of means for separating fine meats from a body of hulls, lint, coarse and fine meats, means for causing a current of air to cross a descending stream of the remaining meats, hulls and lint to separate hulls and lint from the coarse meats, means for receiving the meats, and means for collecting the hulls and lint.

5. In a separating mechanism and ammonia controller for a cotton-seed oil mill, the combination of screening mechanism for separating fine meats from a body of hulls, lint, coarse and fine meats, pneumatic means for removing hulls and lint from the remainder of said body of material as it descends from said screening mechanism, and means for varying the current of air of said pneumatic means to regulate the amount of hulls removed and thereby alter the ammonia content of the meats as desired.

6. In a separating mechanism and ammonia controller of the class described, the combination of means for separating fine meats from a mixture of hulls, lint, coarse and fine meats, an air nozzle, means for guiding the remainder of said mixture across the opening in said nozzle whereby the air current will remove hulls and lint therefrom, means for receiving the coarse and fine meats, and means for receiving the material separated from the meats by said air current.

7. In a separating mechanism and ammonia controller of the class described, the combination of an inclined screen for separating fine meats from a mixture of hulls, lint, coarse and fine meats, means for causing a current of air to pass across and through the material which discharges from the lower end of said screen so as to remove hulls and lint therefrom, means for collecting said hulls and lint, means for regulating said current of air, and means for collecting the fine meats and the remainder of the material after it passes through said current of air.

8. In a separating mechanism of the class described, the combination of an inclined screen for separating fine meats from a mixture of hulls, lint, coarse and fine meats, a suction nozzle for removing hulls and lint from the material discharging from the lower end of said screen, means for collecting said hulls and lint, and means for collecting the fine meats and the material after the same passes through the current of air.

9. In a separating mechanism of the class described, the combination of an inclined frame, a screen mounted in said frame above the bottom thereof, said frame having outlets at the lower end thereof above and below the said screen, a nozzle opposite the lower outlet for causing a current of air to pass through material discharging from the upper outlet, and a deflector board between the inlet of said nozzle and the lower outlet of said frame to prevent the escape of the finer material discharging from said lower outlet with the air passing into said nozzle.

In testimony whereof I affix my signature.

JAMES S. MULLEN.